United States Patent
Mountz et al.

(10) Patent No.: US 8,448,308 B2
(45) Date of Patent: May 28, 2013

(54) BUCKLE

(75) Inventors: Jonathan Kirk Mountz, Elverson, PA (US); Nathanael Saint, Morgantown, PA (US)

(73) Assignee: Nuna International B.V., Amsterdam Zuidoost (NL)

( * ) Notice: Subject to any disclaimer, the term of this patent is extended or adjusted under 35 U.S.C. 154(b) by 350 days.

(21) Appl. No.: 12/696,557

(22) Filed: Jan. 29, 2010

(65) Prior Publication Data

US 2010/0199470 A1    Aug. 12, 2010

Related U.S. Application Data

(60) Provisional application No. 61/207,166, filed on Feb. 6, 2009.

(51) Int. Cl.
   *A44B 11/00*    (2006.01)
(52) U.S. Cl.
   USPC ............. 24/631; 24/321; 24/615; 24/630; 24/593.1; 24/633; 24/636; 24/639
(58) Field of Classification Search
   USPC ............ 24/321, 593.1, 615, 630, 631, 633, 24/636, 639
   See application file for complete search history.

(56) References Cited

U.S. PATENT DOCUMENTS

| | | | | |
|---|---|---|---|---|
| 5,267,377 A | * | 12/1993 | Gillis et al. | 24/641 |
| 5,406,681 A | * | 4/1995 | Olson | 24/650 |
| 5,438,737 A | * | 8/1995 | Anscher et al. | 24/630 |
| 5,813,097 A | * | 9/1998 | Woellert et al. | 24/631 |
| 6,049,954 A | * | 4/2000 | Britto | 24/579.11 |
| 6,076,894 A | * | 6/2000 | Busch | 297/484 |
| 6,155,638 A | * | 12/2000 | Bapst | 297/250.1 |
| 6,393,677 B1 | * | 5/2002 | Anscher | 24/630 |
| 6,463,638 B1 | * | 10/2002 | Pontaoe | 24/614 |
| 6,543,101 B2 | * | 4/2003 | Sack et al. | 24/633 |
| 6,772,973 B2 | * | 8/2004 | Fujii et al. | 242/390.8 |
| 6,796,007 B1 | * | 9/2004 | Anscher | 24/633 |
| 6,868,591 B2 | * | 3/2005 | Dingman et al. | 24/615 |
| 6,983,518 B2 | * | 1/2006 | Chen | 24/636 |
| 7,117,568 B2 | * | 10/2006 | Nolan | 24/579.11 |
| 7,520,036 B1 | * | 4/2009 | Baldwin et al. | 24/635 |
| 7,600,302 B2 | * | 10/2009 | Dillner | 24/615 |
| 2002/0017012 A1 | * | 2/2002 | Sack et al. | 24/633 |
| 2005/0115035 A1 | * | 6/2005 | Karlsson | 24/633 |
| 2005/0125970 A1 | * | 6/2005 | Nolan | 24/615 |
| 2005/0225157 A1 | * | 10/2005 | Patrizi et al. | 297/464 |
| 2006/0168782 A1 | * | 8/2006 | Pontaoe | 24/614 |

FOREIGN PATENT DOCUMENTS

TW    200831362    1/2008

* cited by examiner

*Primary Examiner* — Robert J Sandy
*Assistant Examiner* — David Upchurch
(74) *Attorney, Agent, or Firm* — Steptoe & Johnson LLP (57) ABSTRACT

A buckle includes a buckle body, two first retainers, and two second retainers connected respectively and detachably to the first retainers. The buckle body includes an insert groove having two upwardly facing openings, two stop portions, and a resilient pressing arm. The first retainers are inserted into the insert groove via the openings, respectively. Each of the first retainers includes a resilient retaining plate biased to a retaining position to prevent removal of the corresponding first retainer from the buckle body. Each of the resilient retaining plates is removable from the retaining position. When the resilient pressing arm is pressed, each of the resilient retaining plates is removed from the retaining position by the resilient pressing arm.

19 Claims, 14 Drawing Sheets

FIG. 22

BUCKLE

CROSS-REFERENCE TO RELATED APPLICATION

This application claims priority of U.S. provisional application No. 61/207,166, filed on Feb. 6, 2009.

BACKGROUND OF THE INVENTION

1. Field of the Invention

This invention relates to a buckle, and more particularly to a buckle for interconnecting a plurality of safety straps.

2. Description of the Related Art

Nowadays, an infant carrier, such as a car safety seat, a stroller, a high chair, etc, is typically provided with a buckle interconnecting a plurality of safety straps to provide protection in either three or five directions depending on the age of child in the infant carrier. In the case of five directions, the safety straps include two waist straps, a crotch strap, and two shoulder straps, and are suitable for young children. When the children get older, the shoulder straps are no longer required therefor. A similar buckle is disclosed in Taiwanese Patent Application Publication Number 200831362.

SUMMARY OF THE INVENTION

The object of this invention is to provide a buckle that can be assembled and disassembled easily and that can be adjusted to provide connection to straps in three or five directions.

According to an aspect of this invention, a buckle is provided herein, comprising:

a buckle body including an insert groove having two upwardly facing openings, two stop portions disposed in the insert groove, and a resilient pressing arm; and two first retainers inserted into the insert groove in the buckle body via the upwardly facing openings, respectively, each of the first retainers including a resilient retaining plate biased to a retaining position to thereby abut against a respective one of the stop portions of the buckle body so as to prevent removal of a corresponding one of the first retainers from the buckle body, each of the resilient retaining plates being removable from the retaining position;

wherein the resilient pressing arm of the buckle body includes two actuating portions that are positioned such that, when the resilient pressing arm is pressed, each of the resilient retaining plates is removed from the retaining position by a respective one of the actuating portions.

According to another aspect of this invention, there is provided a buckle comprising:

a buckle body including an insert groove having two upwardly facing openings; and two retainer sets each including a first retainer having a first coupling portion, and a second retainer having a second coupling portion connected removably to the first coupling portion, one of the first and second retainers of each of the retainer sets being configured as a groove having an open end that permits insertion of the other one of the first and second retainers thereinto and that is orientated in a direction different from that of each of the upwardly facing openings of the insert groove.

As such, the first retainers are connected removably to the buckle body, and the second retainers are connected respectively and removably to the first retainers. Consequently, the buckle of this invention can be assembled and disassembled easily. When the buckle is mounted to an infant carrier carrying a child, and when the second retainers are connected respectively to the first retainers, the buckle can be used to interconnect two waist straps, two shoulder straps, and a crotch strap in respective direction to provide protection for the child. If the second retainers are removed respectively from the first retainers, the buckle can provide protection to the child without shoulder straps.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numerals throughout the entire disclosure.

Figure 1:
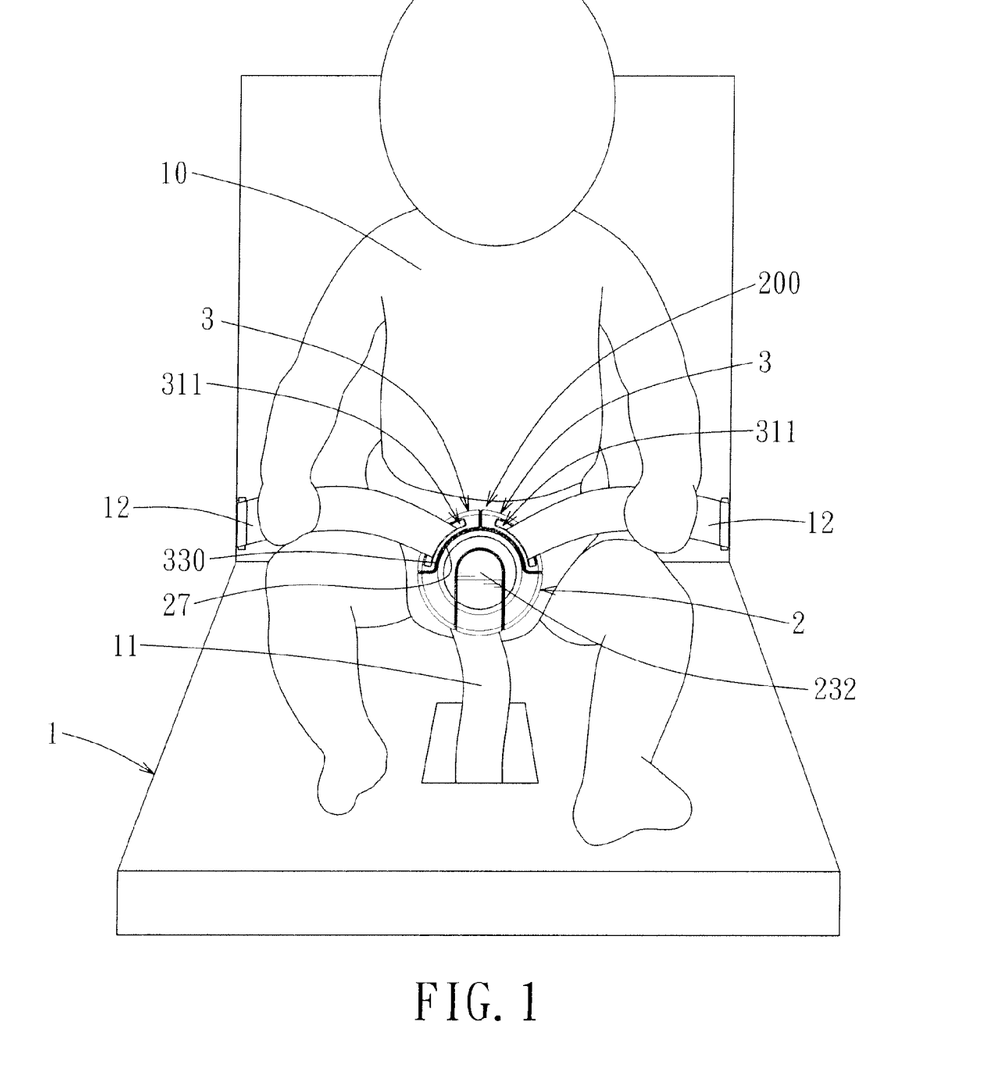
FIG. 1 is a fragmentary schematic view of the first preferred embodiment of a buckle according to this invention, in a state of interconnecting two waist straps and a crotch strap.

Referring to FIG. 1, the first preferred embodiment of a buckle 200 according to this invention is adapted for use with an infant carrier 1. The infant carrier 1 may be a car safety seat, a stroller, a baby rocking chair, or a high chair. The buckle 200 interconnects a plurality of safety straps to bind a child 10 to the infant carrier 1. In this embodiment, the infant carrier 1 is exemplified using a car safety seat, and the safety straps include a crotch strap 11 and two waist straps 12. The buckle 200 includes a buckle body 2 connected to the crotch strap 11, and two first retainers 3 connected removably to the buckle body 2. The first retainers 3 are connected respectively to the waist straps 12.

Figure 2:
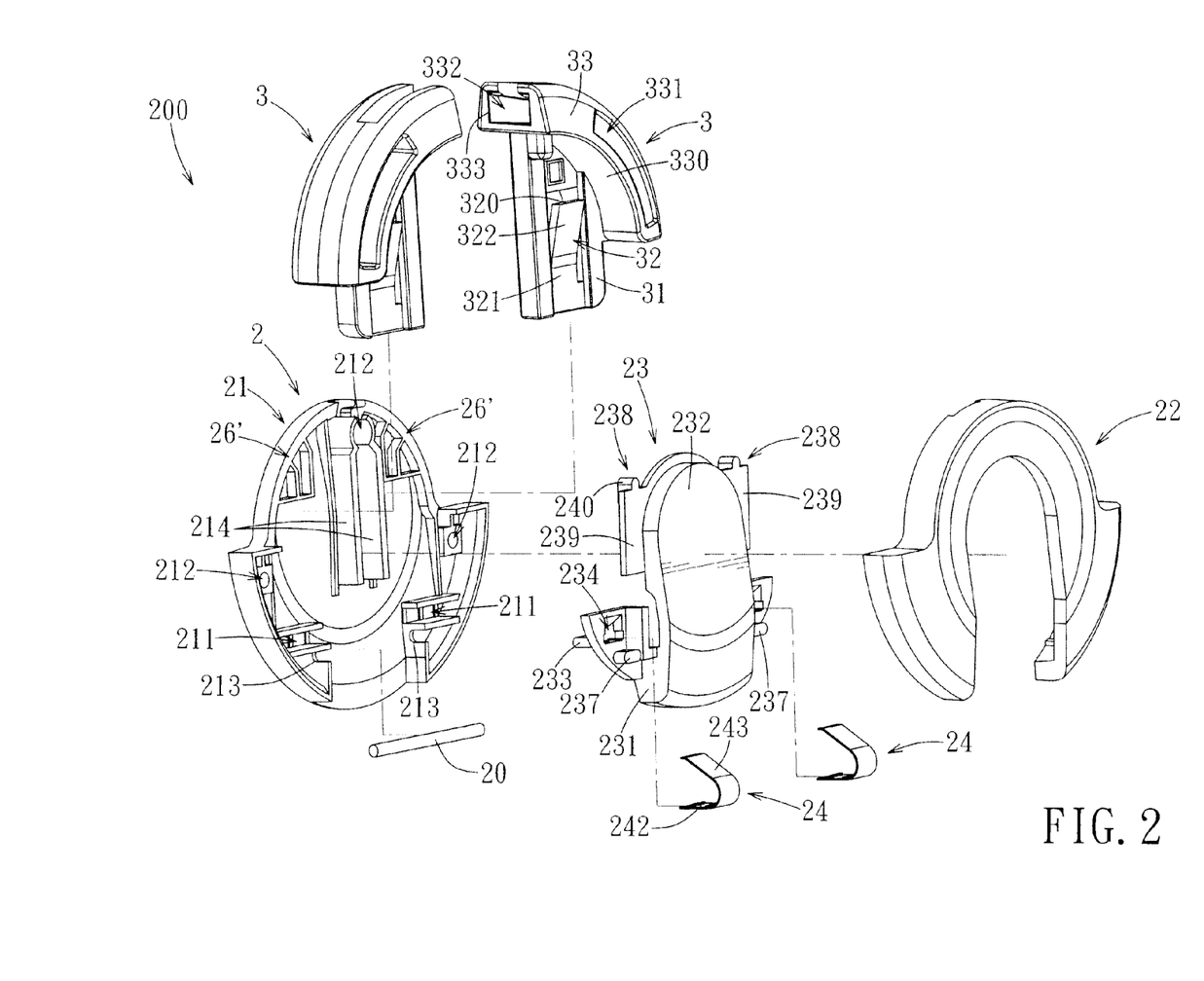
FIG. 2 is a fragmentary, exploded front perspective view of the first preferred embodiment, illustrating a first outer housing, a second outer housing, a release member, two resilient members, and two first retainers.
Figure 3:
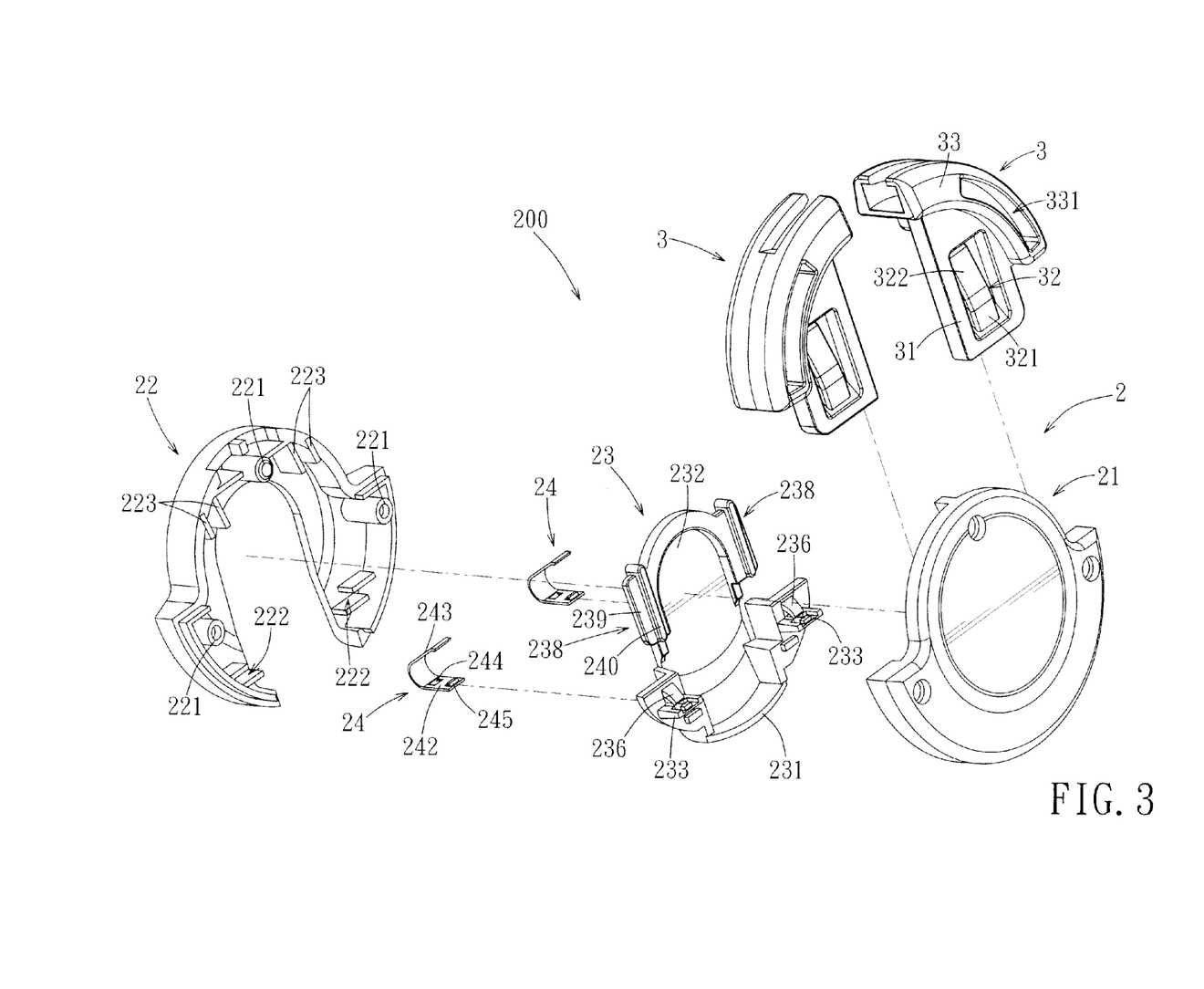
FIG. 3 is a fragmentary, exploded rear perspective view of the first preferred embodiment.
Figure 4:
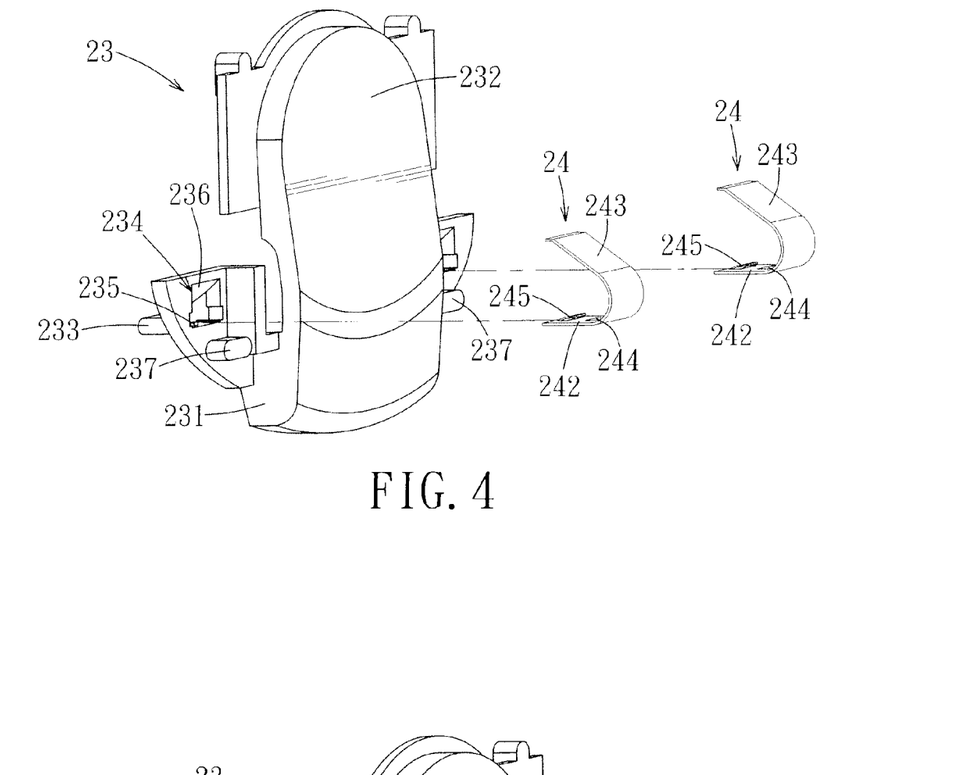
FIG. 4 is a fragmentary, partly exploded perspective view of the first preferred embodiment, illustrating the resilient members removed from the release member.
Figure 5:
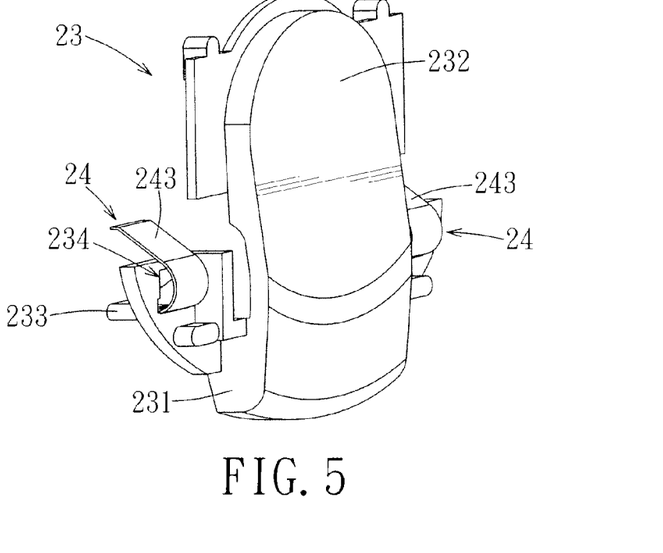
FIG. 5 is a fragmentary, assembled perspective view of the first preferred embodiment.

With further reference to FIGS. 2 and 3, the buckle body 2 includes a first outer housing 21, a second outer housing 22, a release member 23, and a biasing unit consisting of two resilient members 24 for providing a biasing force. A front surface of the first outer housing 21 has two positioning grooves 213 spaced apart from each other in a left-to-right direction, a plurality of mounting holes 212, and two recesses 213 disposed respectively under the positioning grooves 211. The recesses 213 permit a crotch strap connecting pin 20 to engage therewith. The crotch strap 11 is wrapped around the crotch strap connecting pin 20 so as to couple with the buckle body 2. The release member 23 includes a connecting body 231 connected to the first outer housing 21, and a resilient pressing arm 232 extending upwardly from a top end of the connecting body 231, configured as a cantilever, and allowing for manual operation. The connecting body 231 includes two positioning brackets 233 spaced apart from each other in the left-to-right direction, and two positioning holes 234 adjacent respectively to and disposed respectively above the positioning brackets 233. The positioning brackets 233 of the connecting body 231 engage respectively the positioning grooves 211 in the front surface of the first outer housing 21 so as to position the release member 23 on the first outer housing 21.

With further reference to FIGS. 4 to 7, the resilient members 24 are configured as metal spring plates. The first retainers 3 are pressed respectively against the resilient members 24. Each of the resilient members 24 includes a horizontal first plate body 242, and a second plate body 243 extending upwardly and rearwardly from a front end of the first plate body 242. Each of the positioning brackets 233 has a top surface formed with a positioning block 235. The connecting body 231 further includes two positioning hooks 236 extending from a rear surface thereof and spaced apart from each other in the left-to-right direction. The positioning hooks 236 extend toward the positioning brackets 233, respectively, and are spaced apart from the same. The positioning blocks 235 are aligned respectively with the positioning hooks 236. The first plate bodies 242 extend respectively through the positioning holes 234. Each of the first plate bodies 242 has a first connecting portion 244 extending downwardly and rearwardly from a bottom surface of a front end portion thereof and abutting against the corresponding positioning block 235, and a second connecting portion 245 extending upwardly and forwardly from a top surface of a rear end portion thereof and abutting against the corresponding positioning hook 236. As such, forward and rearward movement of the first plate bodies 242 relative to the positioning brackets 233 can be prevented, so that the resilient members 24 are positioned on the release member 23. Furthermore, each of the positioning brackets 233 can provide a stable support to the corresponding first plate body 242. The second plate bodies 243 press respectively and resiliently against lower ends of the first retainers 3 for biasing the first retainers 3 to move upwardly relative to the buckle body 2.

Figures 6, 7:
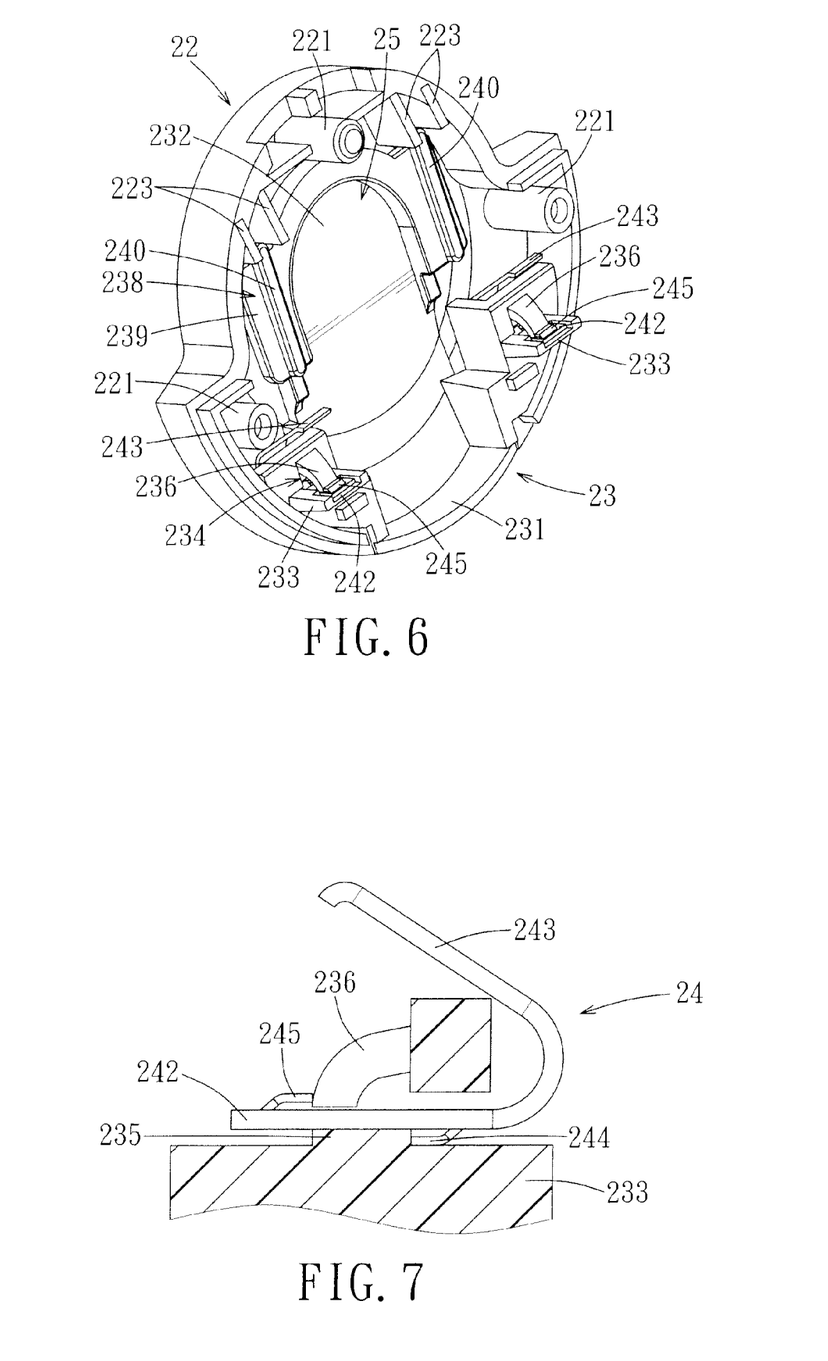
FIG. 6 is a perspective view of the second outer housing, the release member, and the resilient members of the first preferred embodiment.
FIG. 7 is a fragmentary, schematic sectional view of the release member and one of the resilient members, illustrating how a first plate body of the one of the resilient members is positioned on the release member.

With particular reference to FIGS. 2, 3, and 6, the second outer housing 22 is inverted U-shaped, and includes a plurality of positioning rods 221 press-fitted respectively within the mounting holes 212 in the first outer housing 21, and two positioning grooves 222 engaging respectively two projections 237 of the connecting body 231. Due to engagement between the positioning rods 221 and the mounting holes 212 and between the positioning grooves 222 and the projections 237, the first and second outer housings 21, 22 are interconnected fixedly, such that left and right ends of the release member 23 are positioned between the first and second outer housings 21, 22. The release member 23 further includes two actuating portions 238 disposed respectively at left and right sides of the resilient pressing arm 232. Each of the actuating portions 238 includes an abutment plate 239 abutting against an inner surface of the second outer housing 22.

Figure 9:
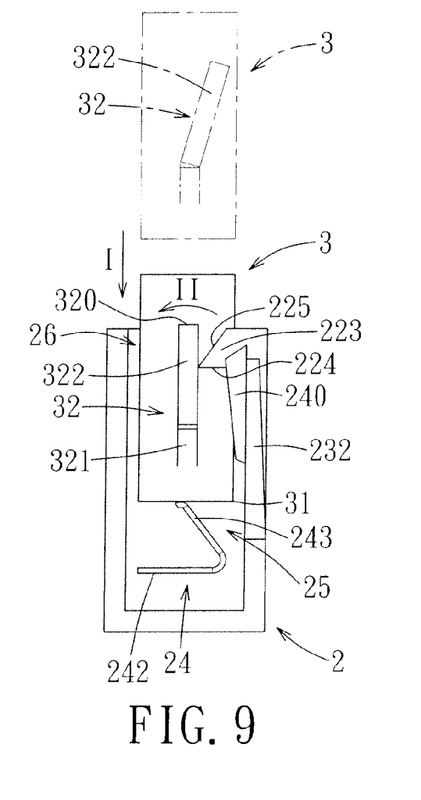
FIG. 9 is a schematic view illustrating how a resilient retaining plate of one of the first retainers is removed from a retaining position when the corresponding first retainer is inserted into an insert groove.

The first and second outer housings 21, 22 cooperate with the release member 23 to define an insert groove 25 allowing for insertion of the first retainers 3 therein. The first outer housing 21 has two opening-defining portions 26' (see FIG. 2) cooperating with the second outer housing 22 to define two upwardly facing openings 26 (one is shown in FIG. 9). The first retainers 3 can be inserted into the insert groove 25 through the upwardly facing openings 26, respectively. The second outer housing 22 includes two retaining units disposed adjacent respectively to the upwardly facing openings 26 for confining the first retainers 3 within the insert groove 25. Each of the retaining units includes two parallel stop plates 223 each having a stop portion 224 configured as a horizontal bottom side. In this embodiment, each of the stop plates 223 further has an inclined side 225 extending upwardly and forwardly from a rear end of the stop portion 224 (i.e. the bottom side thereof). Each of the actuating portions 238 of the release member 23 further includes a rib 240 projecting from a rear surface of the abutment plate 239 and having a top end extending into a space between the stop plates 223 of the corresponding retaining unit. Preferably, each of the ribs 240 is tapered, and has a top end projecting from the corresponding abutment plate 239 farther than a bottom end thereof.

Figure 8:
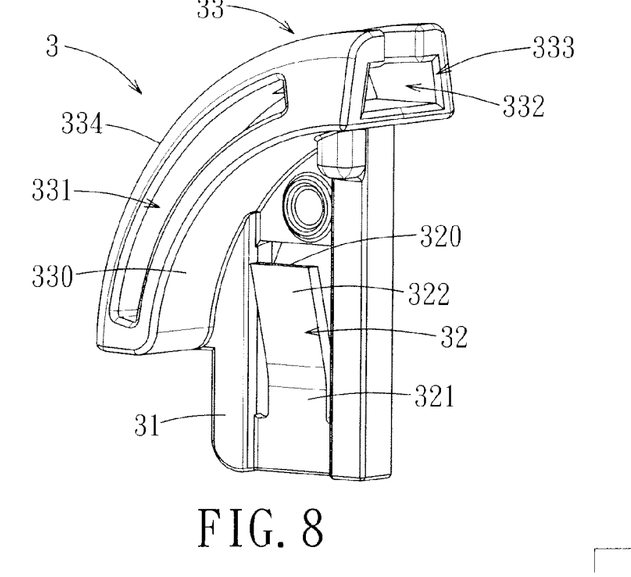
FIG. 8 is a perspective view of one of the first retainers of the first preferred embodiment.

With further reference to FIG. 8, each of the first retainers 3 includes a plate body 31, a resilient retaining plate 32 disposed on a middle portion of the plate body 31, and a curved coupling block 33 disposed on a top end of the plate body 31. Each of the plate bodies 31 is cut to form a tongue plate constituting the resilient retaining plate 32 and having a free end 320. Each of the resilient retaining plates 32 has a vertical connecting plate portion 321 connected to the corresponding plate body 31, and an inclined retaining plate portion 322 extending upwardly and forwardly from a top end of the connecting plate body 321 and aligned with the corresponding rib 240. Each of the resilient retaining plates 32 is disposed at a retaining position whereat a free end 320 thereof abuts against the stop portions 224 of the corresponding stop plates 223 for preventing removal of the corresponding first retainer 3 from the corresponding insert groove 25. Each of the coupling blocks 33 is formed with a curved through hole 331 permitting extension of a waist strap 12 (see FIG. 1) thereinto, such that the waist strap 12 can be mounted to the buckle body 2 by the corresponding first retainer 3.

Figure 10:
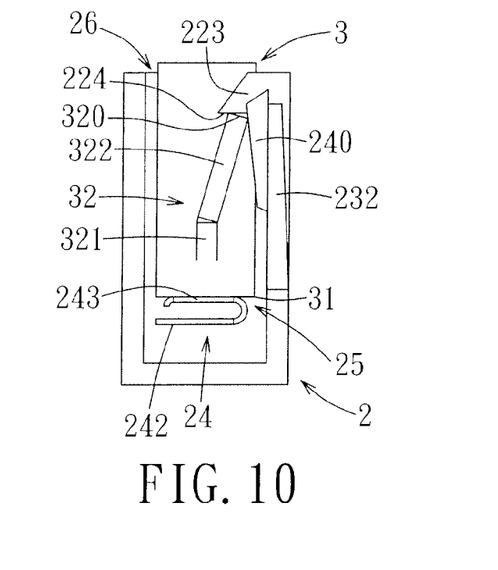
FIG. 10 is a view similar to FIG. 9 but illustrating how the resilient retaining plate is returned to the retaining position when it moves past a stop portion.

With particular reference to FIGS. 1, 2, 9, and 10, when it is desired to assemble one first retainer 3 to the buckle body 2, the first retainer 3 is inserted into the insert groove 25 via the corresponding upwardly facing opening 26 in a first direction (I) (see FIG. 9) toward the corresponding resilient member 24. Before the first retainer 3 is inserted into the insert groove 25, the corresponding resilient member 24 is generally V-shaped. During insertion of the first retainer 3 into the insert groove 25, the resilient retaining plate 32 comes into contact with a junction between the bottom side 224 (i.e., the stop portion) and the inclined side 225 of each of the stop plates 223 of the corresponding retaining unit. When the first retainer 8 continues to move in the first direction (I), the retaining plate portion 322 of the resilient retaining plate 32 is pushed by the stop plates 223 to pivot relative to the connecting plate portion 321 in a second direction (II) (see FIG. 9) until it is aligned with the connecting plate portion 321, as shown by the solid lines in FIG. 9. As soon as the retaining plate portion 322 moves past the stop plates 223, it pivots relative to the connecting plate portion 321 in a direction opposite to the second direction (II) to thereby abut against the stop portions 224 of the stop plates 223 due to the return force of the resilient retaining plate 32, as shown in FIG. 10. At this position, removal of the first retainer 3 from the insert groove 25 is prevented. Also at this position, the plate body 31 of the first retainer 3 presses against the second plate body 243 of the corresponding resilient member 24, so that the corresponding resilient member 24 is U-shaped.

With particular reference to FIGS. 1 and 2, the first retainers 3 are spaced apart from each other by two upright spacer ribs 214 of the first outer housing 21. As such, the waist straps 12 and the crotch strap 11 extending in three different directions can be interconnected by the buckle 200 to retain the child 10 on the infant carrier 1, in such a manner to allow for free movement of an upper body of the child 10.

The buckle body 2 has a curved upper edge 27. The coupling block 33 of each of the first retainers 3 has a curved lower edge 330 abutting against and complementary to a corresponding portion of the curved upper edge 27 of the buckle body 2 so that an assembly of the buckle body 2 and the first retainers 3 has a circular profile, as shown in FIG. 1.

Figure 11:
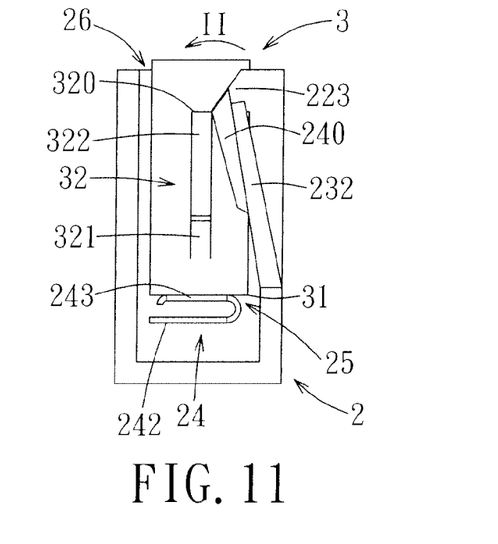
FIG. 11 is a schematic view illustrating how a resilient pressing arm of the release member is pressed to remove the resilient retaining plate from the retaining position to thereby allow the corresponding first retainer to be biased by the corresponding resilient member to eject from the insert groove.
Figure 12:
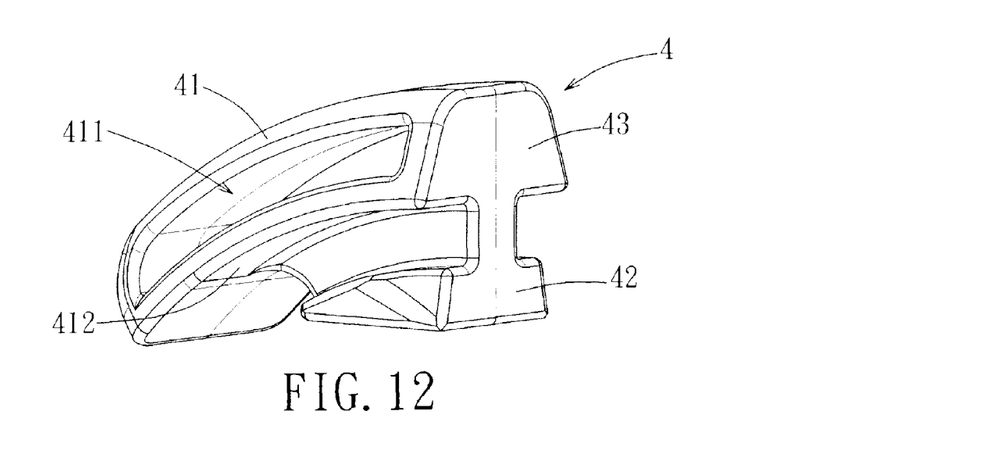
FIG. 12 is a perspective view of a second retainer of the first preferred embodiment.

With particular reference to FIGS. 6 and 11, when it is desired to remove the first retainer 3 from the buckle body 2, the resilient pressing arm 232 of the release member 23 is pressed to pivot the retaining plate portion 322 in the second direction (II) to align with the connecting plate portion 321. Hence, the retaining plate portion 322 is removed from the stop portions 224 of the stop plates 223 and the retaining position, thereby allowing the first retainer 3 to be biased and ejected by the second plate body 243 of the corresponding resilient member 24 from the insert groove 25 in the buckle body 2 via the corresponding upwardly facing opening 26.

Subsequently, the first retainer 3 can be removed from the buckle body 2. It should be noted that, during removal of the first retainer 3 from the buckle body 2, since the top end of the rib 240 projects from the corresponding abutment plate 239 farther than the bottom end of the rib 240 (i.e., the top end of the rib 240 is nearer to the corresponding retaining plate 32 than the bottom end of the rib 240), when it is desired to pivot the retaining plate portion 322 from an inclined position shown in FIG. 10 to a vertical position shown in FIG. 11, it is only necessary to press and move a free end of the resilient pressing arm 232 by a relatively short distance, thereby resulting in an efficient retainer-removing process.

With particular reference to FIGS. 8, 12, 13, and 14, the buckle 200 further includes two second retainers 4 connected respectively to the first retainers 3. Each of the second retainers 4 cooperates with the corresponding first retainer 3 to constitute a retainer set. Each of the first retainers 3 has a first coupling portion 332. Each of the second retainers 4 includes a curved coupling block 41, and a second coupling portion 42 connected integrally to a bottom end of the coupling block 41 and connected removably to the first coupling portion 332 of the corresponding first retainer 3. In this embodiment, each of the first coupling portions 332 is a dovetail groove, and has an open end 333. Each of the second coupling portions 42 is configured as an inverted T-shaped dovetail tongue, is inserted into the dovetail groove 332 in the corresponding first retainer 3 via the open end 333, and is removable from the dovetail groove 332 in the corresponding first retainer 3 via the open end 332.

Figure 13:
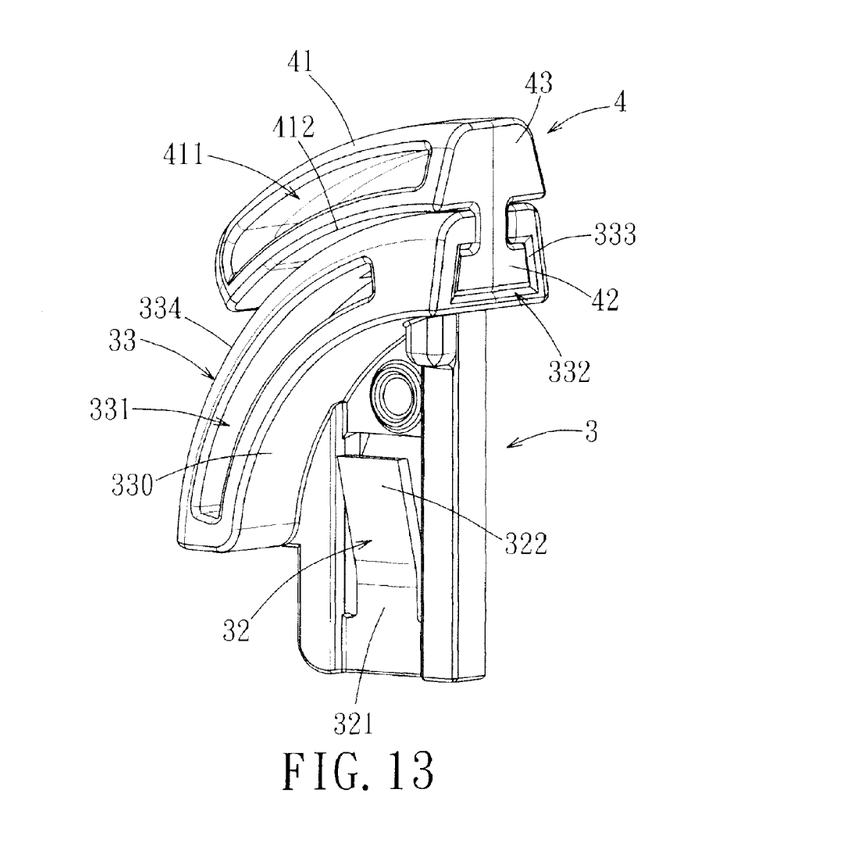
FIG. 13 is a perspective view of a retainer set of the first preferred embodiment.
Figure 14:
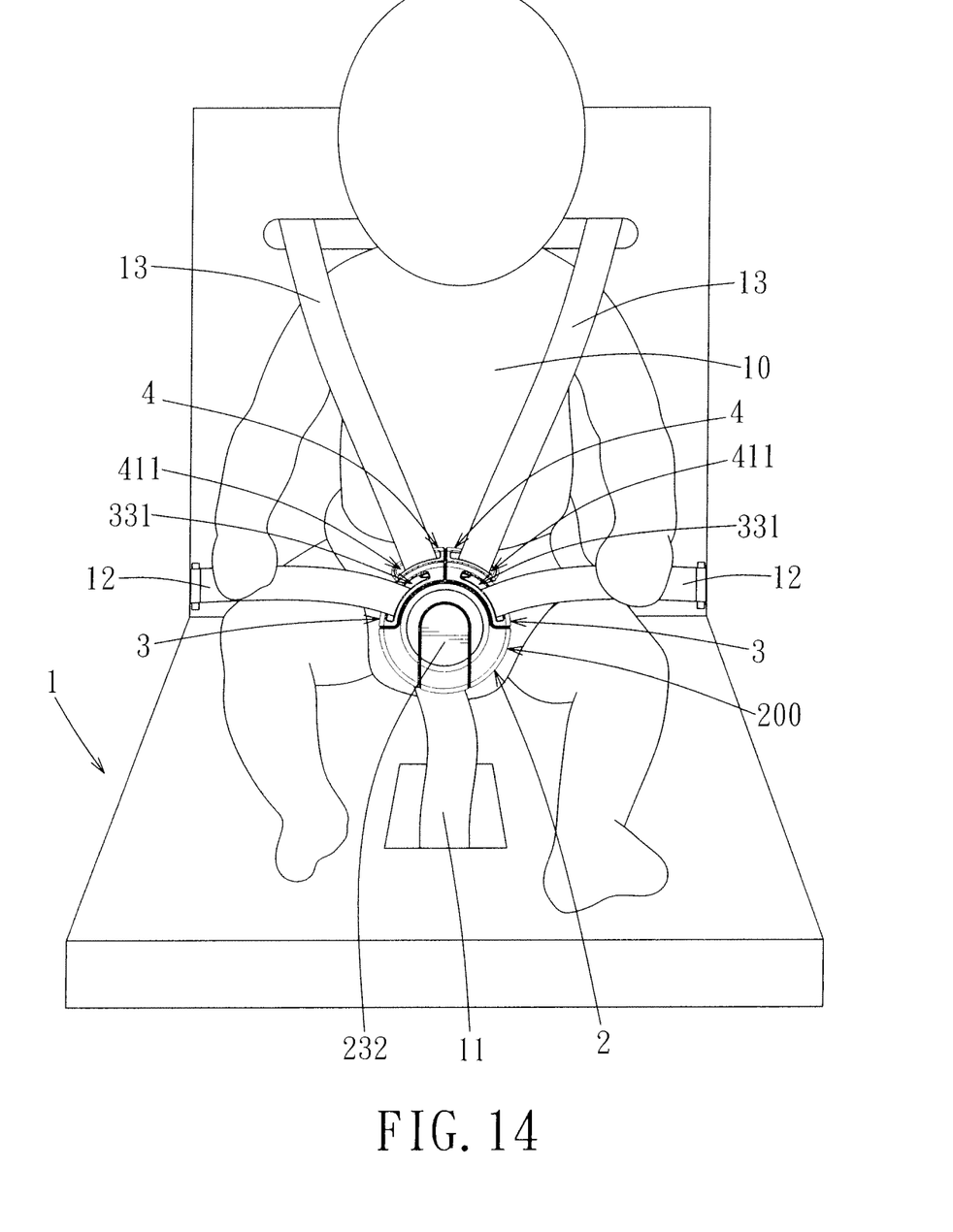
FIG. 14 is a perspective view of the first preferred embodiment, in a state of use of interconnecting two waist straps, two shoulder straps, and a crotch strap.

With particular reference to FIGS. 13 and 14, each of the coupling blocks 41 has a curved through hole 411 allowing for extension of one shoulder strap 13 therein. When use of the shoulder strap 13 is desired, the second coupling portions 42 of the second retainers 4 are first engaged respectively into the first coupling portions 332 of the first retainers 3 via the open ends 333 to thereby connect the second retainers 4 to the coupling blocks 33 of the first retainers 3, respectively. Next, the first retainers 3 are inserted into the insert groove 25 in the buckle body 3 via the upwardly facing openings 26, respectively, as shown in FIG. 9, such that the first retainers 3 are confined within the insert groove 25, as shown in FIG. 10. As such, the module buckle 200 can interconnect a crotch strap 11, two waist straps 12, and two shoulder straps 13 to retain the child 10 on the infant carrier 1, so as to support and protect the child 10 such that an upper body of the child 10 is protected by the shoulder straps 13.

The coupling block 33 of each of the first retainers 3 further includes a curved upper edge 334. The coupling block 41 of each of the second retainers 4 has a curved lower edge 412 abutting against and complementary to the curved upper edge 334 of the corresponding first retainer 3, such that the buckle 200 is compact. It should be noted that, when the second retainers 4 are connected respectively to the first retainers 3, and the first retainers 3 are confined within the buckle body 2, the open end 333 of each of the first coupling portions 332 is orientated in a direction that is different from that of each of the upwardly facing openings 26, and that, in this embodiment, is perpendicular to that of each of the upwardly facing openings 26. Each inner end surface 43 of the second retainers 4 face toward and are adjacent to each other so as to prevent removal of each of the second retainers 4 from the corresponding first retainer 3.

Figure 15:
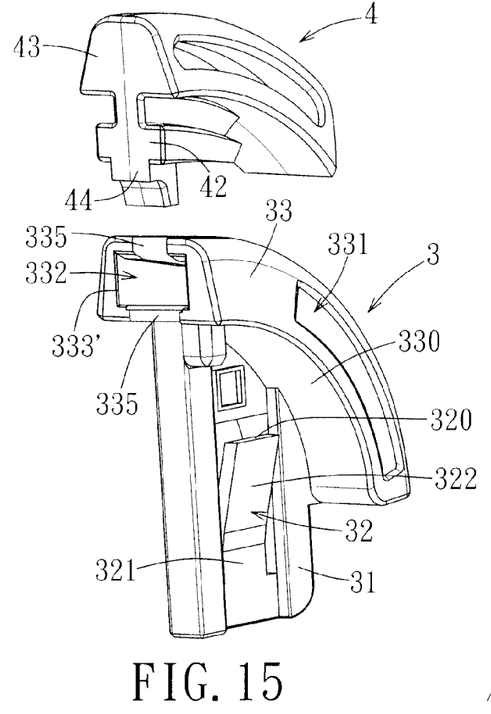
FIG. 15 is an exploded perspective view of a modified retainer set including a modified first retainer and a modified second retainer.
Figure 16:
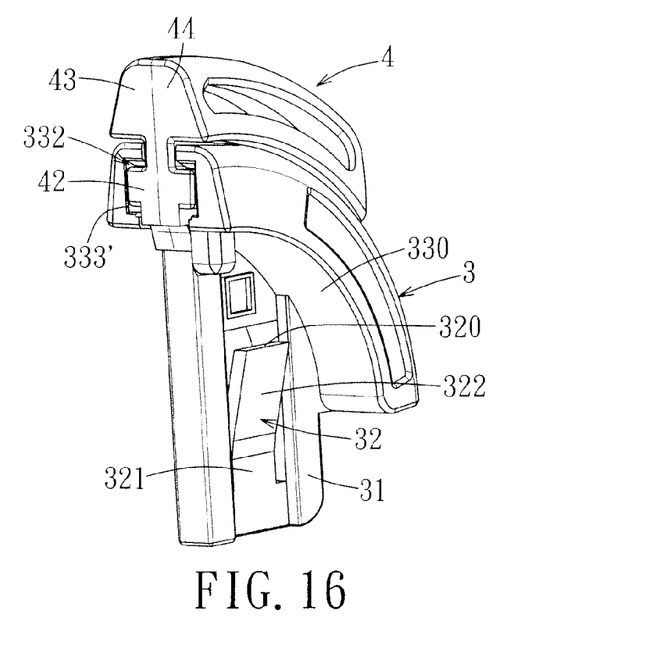
FIG. 16 is an assembled perspective view of the modified first and second retainers.
Figure 17:
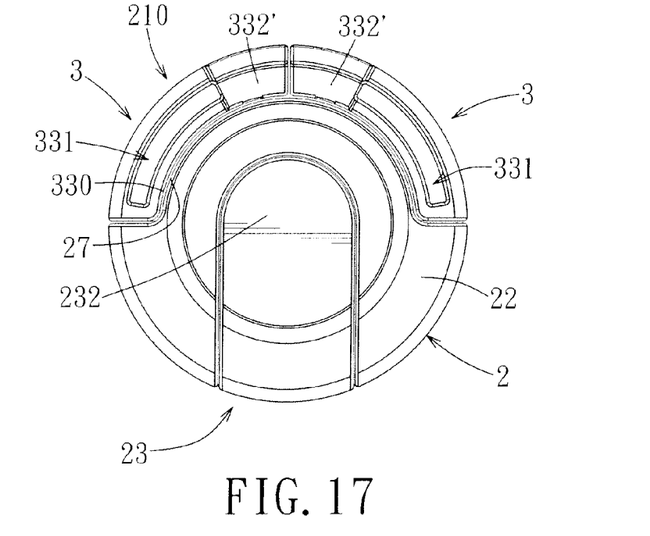
FIG. 17 is a fragmentary front view of the second preferred embodiment of a buckle according to this invention, in a state of being able to interconnect two waist straps, two shoulder straps, and a crotch strap.
Figure 18:
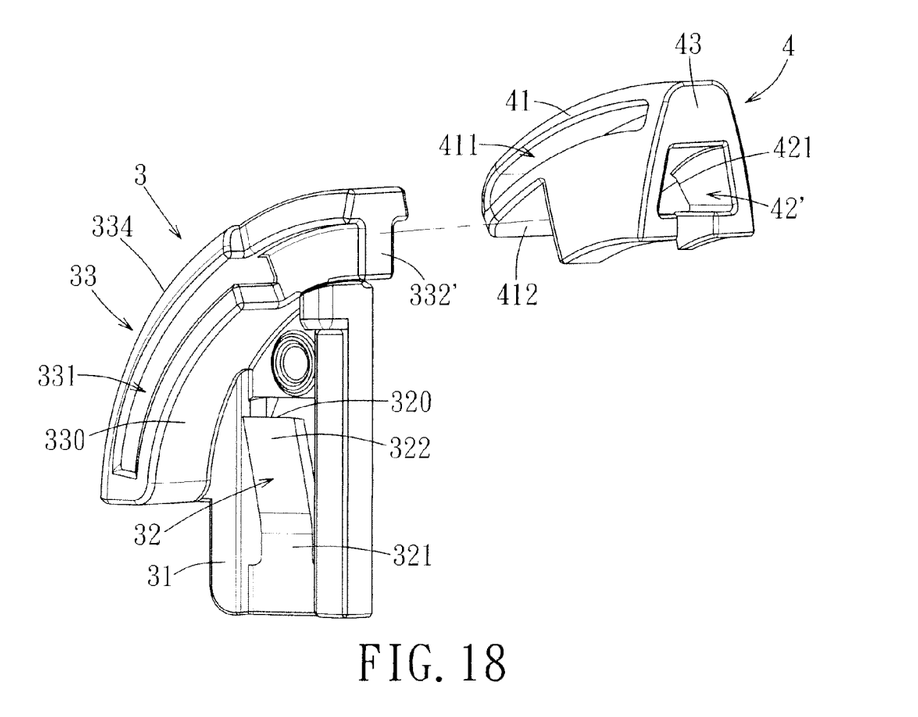
FIG. 18 is a fragmentary, exploded perspective view of a first retainer and a second retainer of the second preferred embodiment.
Figure 19:
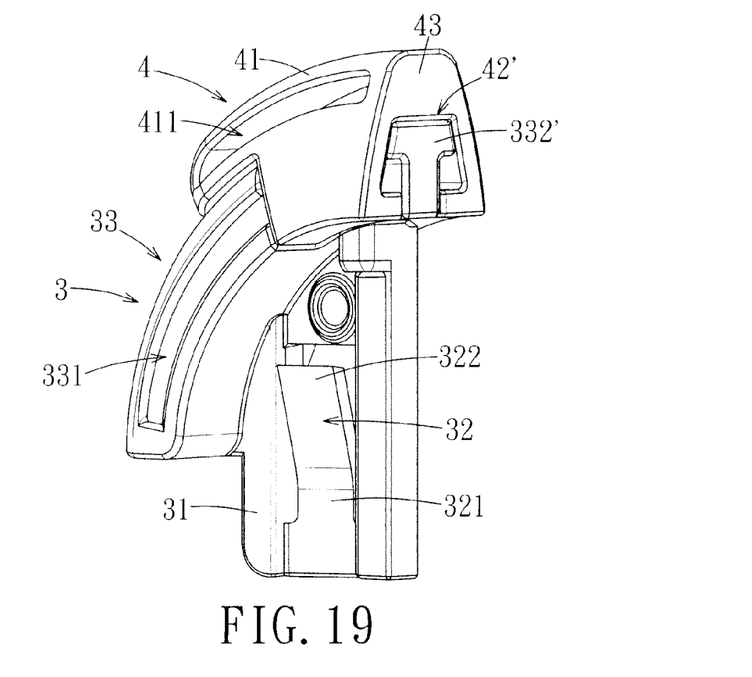
FIG. 19 is an assembled perspective view of the first and second retainers of the second preferred embodiment.
Figure 20:
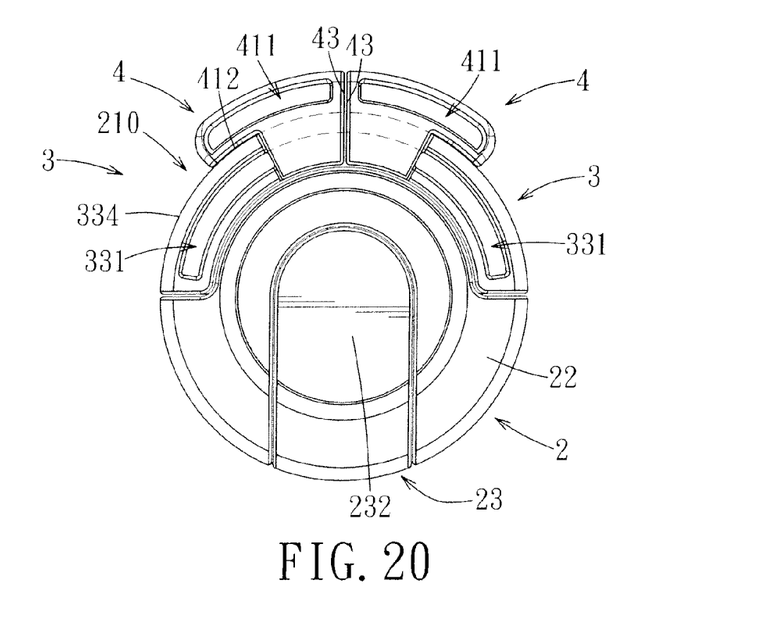
FIG. 20 is a front view of the second preferred embodiment, in a state of being able to interconnect two waist straps, two shoulders, and a crotch strap.

FIGS. 15 and 16 show a modified retainer set including a modified first retainer 3 and a modified second retainer 4. A wall of the modified first retainer 3 defining the open end 333' of the slot 332 has opposite top and bottom wall portions formed with aligned notches 335, respectively. The modified second retainer 4 has an engagement portion 44 engaging the notch 335 in the bottom wall portion of the modified first retainer 3 for facilitating firm connection between the modified first and second retainers 3, 4 due to an increase in contact area between the modified first and second retainers 3, 4.

FIGS. 17, 18, 19, and 20 show the second preferred embodiment of a buckle 210 according to this invention, which is similar in construction to the first preferred embodiment. Unlike the first preferred embodiment, the first coupling portion 332' of each of the first retainers 3 is configured as a T-shaped dovetail tongue, and the second coupling portions 42' of each of the second retainers 4 is configured as a dovetail groove, and has an open end 421. The first coupling portions 332' are engaged respectively into the second coupling portions 42' via the open ends 421, respectively. Inner end surfaces 43 of the second retainers 4 face toward and are adjacent to each other to thereby prevent removal of each of the second retainers 4 from the corresponding first retainer 3.

Figure 21:
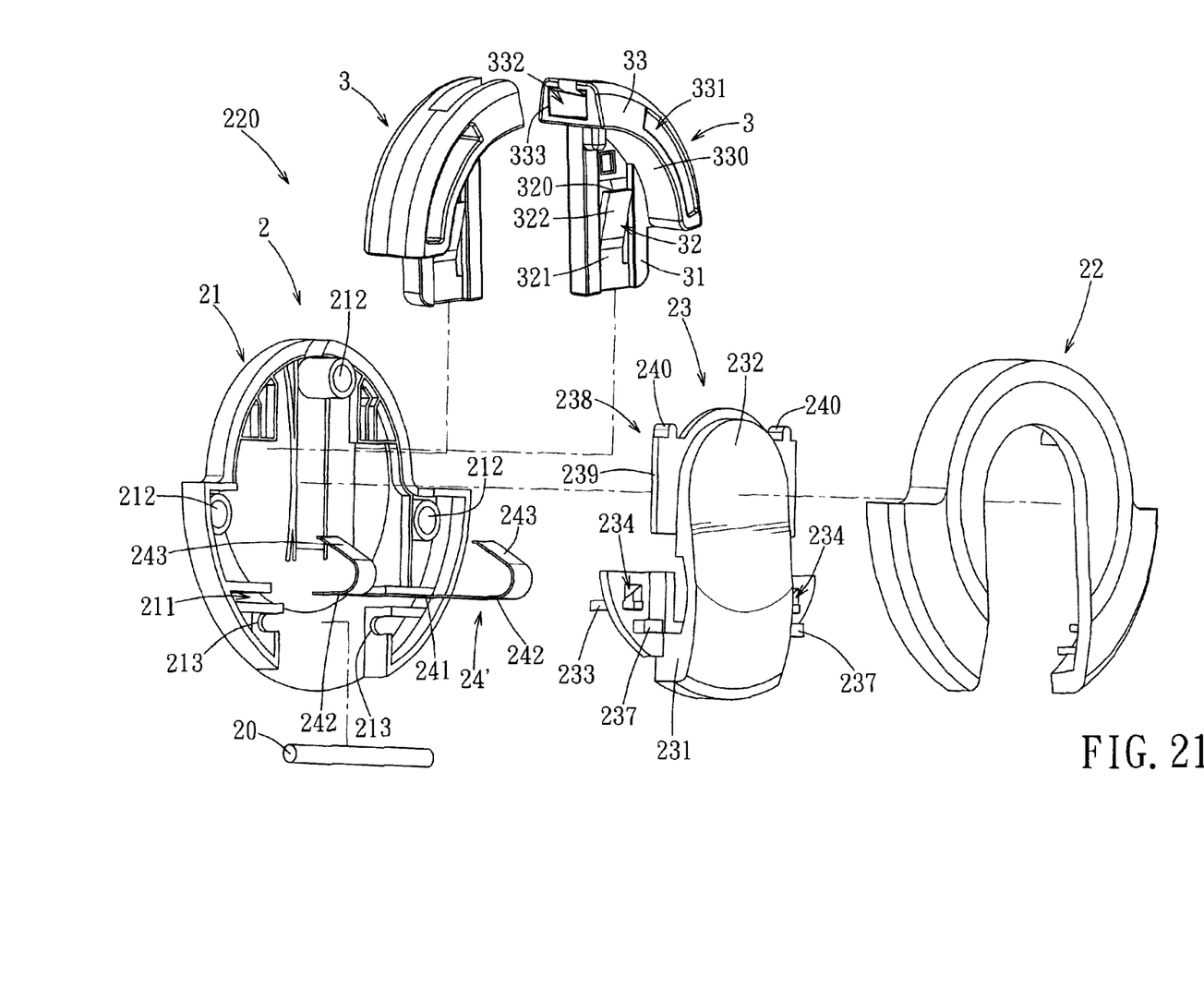
FIG. 21 is an exploded perspective view of the third preferred embodiment of a buckle according to this invention, illustrating a biasing unit including a single resilient member.
Figure 22:
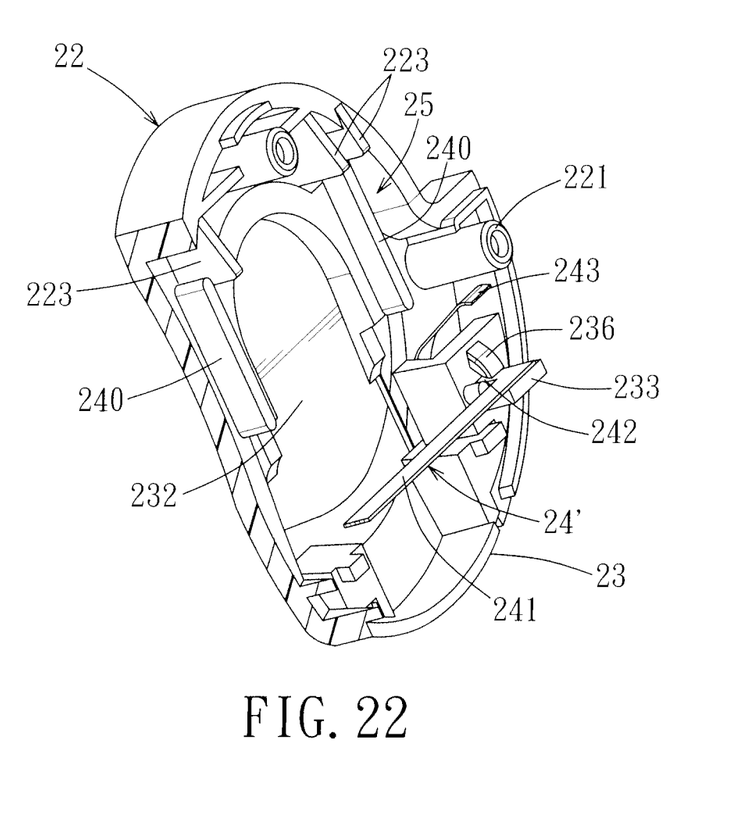
FIG. 22 is a perspective view of a second outer housing, a release member, and the resilient member of the third preferred embodiment.

FIGS. 21 and 22 show the third preferred embodiment of a buckle 220 according to this invention, which is similar in construction to the first preferred embodiment except that the biasing unit is configured as a single resilient member 24'. The resilient member 24' includes a connecting plate body 241, two first plate bodies 242, and two second plate bodies 243. The structures of the first and second plate bodies 242, 243 are similar respectively to those of the first preferred embodiment. The connecting plate body 241 is coplanar with and connected fixedly between the first plate bodies 242. Unlike the first preferred embodiment, the second plate bodies 243 extend respectively through the positioning holes 234 to position the resilient member 24' relative to the buckle body 2.

In view of the above, in the buckle 200, 210, 220, since the first retainers 3 are connected removably to the buckle body 2, and since the second retainers 4 are connected respectively and removably to the first retainers 3, the buckle 200, 210, 220 can be adjusted easily to interconnect three or five straps extending in different directions. Furthermore, the second retainers 4 can be assembled respectively to the first retainers 3 whether or not the first retainers 3 are connected to the buckle body 2, thereby resulting in convenience during use.

With this invention thus explained, it is apparent that numerous modifications and variations can be made without departing from the scope and spirit of this invention. It is therefore intended that this invention be limited only as indicated by the appended claims.

We claim:

1. A buckle comprising:
a buckle body including an insert groove having two upwardly facing openings, two stop portions disposed in said insert groove, and a resilient pressing arm;
two first retainers inserted into said insert groove in said buckle body via said upwardly facing openings, respectively, each of said first retainers including a resilient retaining plate biased to a retaining position to thereby abut against a respective one of said stop portions of said buckle body so as to prevent removal of a corresponding one of said first retainers from said buckle body; and
a biasing unit for providing a biasing force to eject said first retainers from said upwardly facing openings, respectively,
wherein said resilient pressing arm of said buckle body includes two actuating portions that are positioned such that, when said resilient pressing arm is pressed, each of said resilient retaining plates of said first retainers is removed from said retaining position by a respective one of said actuating portions;
wherein said buckle body further includes a first outer housing, a second outer housing, and a release member disposed between said first and second outer housings and including said resilient pressing arm and a connecting body connected to said first outer housing, said resilient pressing arm extending upwardly from a top end of said connecting body, being configured as a cantilever, and allowing for manual operation, and
wherein said biasing unit includes two first plate bodies each having an end, and two second plate bodies extending respectively from said ends of said first plate bodies and pressing respectively against said first retainers, said second plate bodies cooperating to provide said biasing force, said buckle body further including two positioning brackets disposed in said insert groove for supporting said first plate bodies, respectively.

2. The buckle as claimed in claim 1, further comprising two second retainers, each of said first retainers including a first coupling portion, each of said second retainers including a second coupling portion connected removably to a respective one of said first coupling portions of said first retainers.

3. The buckle as claimed in claim 2, wherein each of said first coupling portions of said first retainers is configured as one of a groove and a tongue, and each of said second coupling portions of said second retainers is configured as the other one of said groove and said tongue.

4. The buckle as claimed in claim 2, wherein said first coupling portions are configured as grooves each having an open end, and said second coupling portions are configured as tongues engaged respectively into said grooves via said open ends of said grooves, each of said second retainers having an end surface, said end surfaces of said second retainers facing toward and being adjacent to each other so as to prevent removal of said second retainers from said first retainers.

5. The buckle as claimed in claim 4, wherein said open end of each of said grooves is defined by a wall having opposite top and bottom wall portions that are formed with aligned notches, respectively, each of said second retainers further including an engagement portion engaging said notch in said bottom wall portion of a corresponding one of said first retainers.

6. The buckle as claimed in claim 2, wherein said second coupling portions are configured as grooves each having an open end, and said first coupling portions are configured as tongues engaged respectively into said grooves via said open ends of said grooves, each of said second retainers having an end surface, said end surfaces of said second retainers facing toward and being adjacent to each other so as to prevent removal of said second retainers from said first retainers.

7. The buckle as claimed in claim 1, wherein each of said first retainers includes a plate body that is inserted into said insert groove and that is cut to form a tongue plate constituting said resilient retaining plate and having a free end, said free ends of said tongue plates of said first retainers abutting respectively against said stop portions of said buckle body to prevent removal of said first retainers from said buckle body.

8. The buckle as claimed in claim 7, wherein each of said actuating portions includes a rib aligned with said resilient retaining plate of a corresponding one of said first retainers and having a bottom end and a top end nearer to said resilient retaining plate of the corresponding one of said first retainers than said bottom end.

9. The buckle as claimed in claim 1, wherein said positioning brackets are disposed on said release member, said release member including two positioning holes permitting extension of said first plate bodies therethrough, respectively, and two positioning hooks disposed respectively opposite to and spaced apart from said positioning brackets, each of said positioning brackets including a positioning block, said positioning blocks of said positioning brackets being aligned respectively with said positioning hooks, each of said first plate bodies including a first connecting portion abutting against a respective one of said positioning blocks, and a second connecting portion abutting against a respective one of said positioning hooks.

10. The buckle as claimed in claim 1, wherein said buckle body further includes a biasing unit for providing a biasing force to eject said first retainers from said upwardly facing openings, respectively.

11. The buckle as claimed in claim 1, wherein said biasing unit includes two first plate bodies each having an end, two second plate bodies extending respectively from said ends of said first plate bodies and pressing respectively against said first retainers for biasing said first retainers to eject from said upwardly facing openings, respectively, and a connecting plate body coplanar with and connected fixedly between said first plate bodies.

12. The buckle as claimed in claim 11, wherein said release member includes two positioning holes, said second plate bodies extending through said positioning holes, respectively, so as to position said biasing unit relative to said buckle body.

13. The buckle as claimed in claim 1, further comprising two second retainers, each of said first retainers including a first coupling portion, each of said second retainers including a second coupling portion connected removably to a respective one of said first coupling portions of said first retainers.

14. The buckle as claimed in claim 13, wherein each of said first coupling portions of said first retainers is configured as one of a groove and a tongue, and each of said second coupling portions of said second retainers is configured as the other one of said groove and said tongue.

15. The buckle as claimed in claim 13, wherein said first coupling portions are configured as grooves each having an open end, and said second coupling portions are configured as a tongue engaged respectively into said grooves via said open ends of said grooves, each of said second retainers having an end surface, said end surfaces of said second retainers facing toward and being adjacent to each other so as to prevent removal of said second retainers from said first retainers.

16. The buckle as claimed in claim 13, wherein said second coupling portions are configured as grooves each having an open end, and said first coupling portions are configured as block engaged respectively into said grooves via said open ends of said grooves, each of said second retainers having an end surface, said end surfaces of said second retainers facing toward and being adjacent to each other so as to prevent removal of said second retainers from said first retainers.

17. A buckle comprising:
a buckle body including an insert groove having two upwardly facing openings; and
two retainer sets each including a first retainer having a first coupling portion, and a second retainer having a second coupling portion connected removably to said first coupling portion, one of said first and second retainers of each of said retainer sets being configured as a groove having an open end that permits insertion of the other one of said first and second retainers of a corresponding one of said retainer sets thereinto and that is orientated in a direction different from that of each of said upwardly facing openings of said insert groove;
wherein the other one of said first and second retainers of each of said retainer sets is configured as a tongue that is inserted into said groove and that has an end surface, said end surfaces of said tongues of said retainer sets facing toward and being adjacent to each other so as to prevent removal of said second retainers from said first retainers, and
wherein the direction is perpendicular to that of each of said upwardly facing openings of said insert groove.

18. The buckle as claimed in claim 17, wherein said buckle body has a curved upper edge, and each of said first retainers includes a curved coupling block having a curved lower edge abutting against and complementary to said curved upper edge of said buckle body.

19. The buckle as claimed in claim 17, wherein each of said first retainers has a curved upper edge, and each of said second retainers including a curved coupling block having a curved lower edge, said curved upper edges of said first retainers abutting respectively against and complementary respectively to said curved lower edges of said curved coupling blocks of said second retainers.

\* \* \* \* \*